(No Model.)
W. C. DOWNEY.
GRAIN DRILL.
No. 315,260. Patented Apr. 7, 1885.
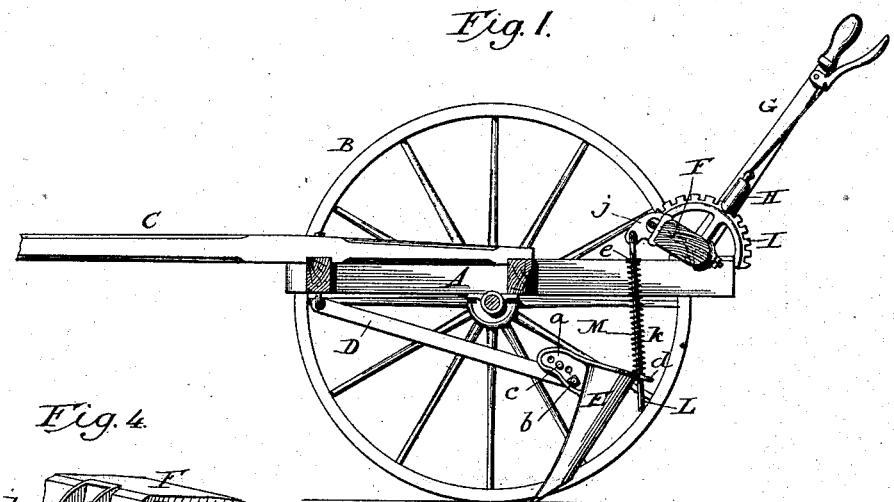
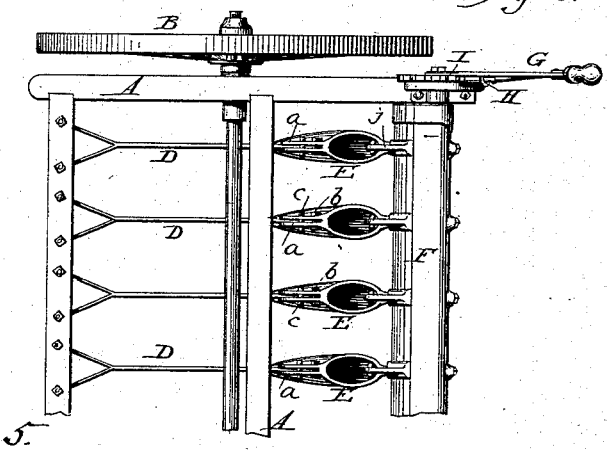
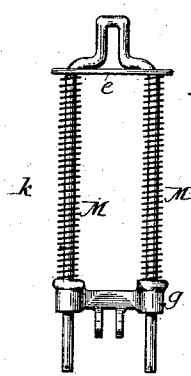
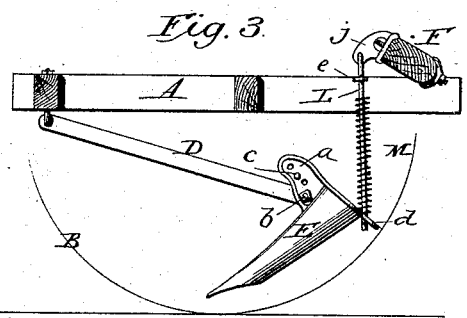
WITNESSES
INVENTOR
W. C. Downey
By P. T. Dodge
Attorney

UNITED STATES PATENT OFFICE.

WILLIAM C. DOWNEY, OF SPRINGFIELD, OHIO.

GRAIN-DRILL.

SPECIFICATION forming part of Letters Patent No. 315,260, dated April 7, 1885.

Application filed September 22, 1884. (No model.)

*To all whom it may concern:*

Be it known that I, WILLIAM C. DOWNEY, of Springfield, in the county of Clark and State of Ohio, have invented certain Improvements in Grain-Drills, of which the following is a specification.

This invention has reference to that class of machines in which the seed is delivered through tubular hoes or drill-teeth attached to the rear ends of the drag-bars and depressed by means of springs.

The principal objects of the invention are to organize the parts in such manner as to secure efficient action of the springs, and at the same time permit the teeth to yield or tip freely backward when turning or backing the machine, to permit the teeth to descend into cross-furrows and depressions below the general level of the surface, and to permit the teeth to be wholly relieved of the pressure of the springs at will.

To this end it consists in the improved construction and arrangement of parts hereinafter described and claimed.

Figure 1 represents a longitudinal vertical section of a grain-drill having my improvements incorporated therein, the feed-box, feed mechanism, and other ordinary parts of the machine which have no connection with the present invention being omitted. Fig. 2 represents a top plan view of one side of the machine. Fig. 3 is a longitudinal section illustrating the yielding or tipping action of the hoes. Figs. 4 and 5 are views of details.

Referring to the accompanying drawings, A represents the horizontal main frame carried by two ground-wheels, B, and provided with a draft pole or tongue, C. To the front of the frame I hinge, as usual, a series of backwardly-extending drag bars or beams, D, each of which is provided at the rear end with an upright tubular hoe, E, having its point adapted to open a furrow for the reception of the seed. Each hoe is constructed with a forwardly-extending arm, a, slotted vertically and longitudinally to receive the rear end of the drag-bar, which is united thereto by a horizontal pivot, b. The hoe is maintained normally in an operative position by means of a transverse wooden pin, c, inserted through a hole in its forward arm and bearing in or upon the drag-bars, in a manner well understood in the art. In the event of the hoe being subjected to a pressure or resistance on the rear side of its point—as, for example, when the machine is moved backward or turned in the field—the pivotal connection permits the top of the hoe to tip backward in the manner represented in Fig. 3, so that it may pass freely over the ground without danger of breaking its point or tooth.

The foregoing parts are of substantially the ordinary construction, and are not claimed as of my invention.

On the rear side of the frame I mount a bar, F, extending from side to side thereof and sustained by horizontal journals at its ends. This bar is provided at one end with a hand-lever, G, by which it may be adjusted and locked, the lever being in turn provided with a locking-dog, H, arranged to engage a stationary notched plate, I, bolted to the main frame, this plate being commonly cast in one piece with the bearing which supports the adjacent end of the rock-bar.

To the forward side of the rock-bar I bolt a series of metal plates, $j$, each of which is connected by a vertical rod or rods, $k$, to the rear side of the hoe located thereunder.

I prefer to employ in connection with each hoe a single rod, L, the upper end of which is hooked through or pivoted to the corresponding plate $j$, while its lower end is extended vertically and loosely through an ear, $d$, cast for the purpose on the rear side of the hoe at its top.

As is represented, I place around each lifting-rod L a spiral spring, M, the lower end of which is arranged to rest upon the ear of the hoe, while the upper end is arranged to bear beneath a collar, $e$, pinned or otherwise fastened upon the upper end of the rod. The lower end of the rod is provided with a transverse pin, or with a nut or equivalent enlargement, to prevent its withdrawal from the ears of the hoes.

As shown in the drawings, the rods are made of such length as to extend a considerable distance below the ears of the hoes when the latter are in their normal operative positions. The length of the springs is less than that of the rods, or so near the length of the same that when the lower end of the rod acts to lift the hoe the spring is entirely or practically relieved from tension.

A distinctive feature of my machine resides in the fact that the lifting-rods are of considerably greater length in relation to the length of the springs than in machines hitherto known in the art This elongation of the rods is advantageous in that it permits the individual hoes to drop below their usual positions in passing through cross-furrows or other sudden depressions in the surface, and this without depressing the rods and hoes in such manner as to subject the hoes when in their normal positions to an excessive pressure. As a consequence of this action the furrows are continued without interruption through the depressed portions of the surface and the proper deposition of the seed insured. This is a feature of importance, inasmuch as it avoids a frequent interruption of the furrows which occurs in machines as ordinarily constructed.

I am aware that lifting-rods and depressing-springs have been combined with hoes and drag-bars; but the length of the spring was so great in relation to that of the rod that the mode of action above set forth could not be secured. The prolongation of my rods, so that the hoes subjected when in action to a moderate pressure are at the same time free to descend into furrows and unusual depressions of the surface, is highly advantageous.

I am also aware that pressure-springs have been applied in connection with the revolving cutting-cylinder of a stalk-chopping machine, the cylinder arranged to roll over the ground and to have its knives forced downward by the spring. To such construction I lay no claim. On turning the rock-bar F in a forward direction by means of the hand-lever the rods are forced downward and the collars thereon caused to compress the springs, which act in turn to force the hoes downward into the soil. The degree of pressure applied may be regulated and maintained at will by locking the hand-lever at the proper point. On turning the hand-lever backward a sufficient distance the rods will be elevated until the pins or heads at their lower ends engage on the ears of the hoes, whereupon the entire series will be lifted from the ground.

It will be perceived that owing to the elongation of the rods they may be so adjusted as to relieve the hoes entirely from the action of the springs, so that they may act wholly by gravity, and this although they are permitted a suitable play in a vertical direction.

Instead of pivoting the rods to the plates *j* and arranging them to slide through the ears of the hoes, the reverse arrangement may be employed, as in Fig. 4, the lower end of the rod being hooked or pivoted to the hoe and its upper end arranged to slide through a guide-block swiveled to the plate *j*.

In soils which demand a heavy pressure to the hoes two springs may be employed in connection with each hoe, the rods in such case being constructed of a U form, as shown in Fig. 5, to present two vertical arms, each of which will carry the spring, as represented. When these double rods are employed, their ends may be arranged to slide through corresponding ears formed on the hoes, or they may be arranged to slide through plates *g*, connected by a horizontal pivot to the ear on the rear side of the hoe, as shown, the action being essentially the same as in the previously-described form. Owing to the fact that the springs are applied directly upon the hoes, their full strength or power is rendered available.

The connection of the spring to the rear sides of the hoes which are pivoted to the drag-bars is highly advantageous in that the hoes are permitted to tip freely backward without limitation or interruption from the springs.

While I am aware that springs have been variously applied to effect the depression of hoes, and also that hoes have been pivoted to drag-bars, I believe myself to be the first to apply a depressing-spring to the rear side of a hoe which is pivoted to the drag-bar in such manner as to tip backward.

Having thus described my invention, what I claim is—

1. In a grain-drill, a tubular hoe, in combination with a drag-bar pivoted to the forward side of said hoe and a depressing-spring connected to the rear side of the hoe, substantially as shown and described, whereby the pressure of the spring is applied directly to the hoe, but the latter permitted to tip backward when required.

2. In a grain-drill, a drag-bar combined with a tubular hoe pivoted at its forward side to said bar, a depressing-spring acting upon the rear side of the hoe, and means, substantially such as described and shown, for effecting the compression of the spring.

3. In a grain-drill, the combination of a wheeled frame, the drag-bar, the tubular hoe jointed to the rear end of said drag-bar, a spiral spring acting upon the rear side of the hoe, a rocking bar on the frame, and a sliding rod or rods extending through the spring and connecting the hoe with the rock-bar.

4. In a grain-drill, the wheeled frame provided with drag-bars, in combination with hoes pivoted to said bars, a rock-shaft located on the rear end of the frame, devices, substantially as shown, for operating and locking said shaft, rods extending from said shaft to the rear sides of the individual hoes, with a sliding connection at one end, and spiral springs mounted on said rods and acting to depress the hoes, as described.

5. In a grain-drill, the combination of the tubular hoes, the lifting-rods therefor, the devices for adjusting said rods, and the pressure-springs of a length less than that portion of the rods on which they play, whereby the parts may be adjusted to apply the proper pressure to the hoes when the latter are in their normal operative positions and the hoes permitted without readjustment of the parts to drop below the normal position free from the influence of the spring in passing furrows and other depressions in the surface.

6. In a grain-drilling machine, the wheeled frame and its drag-bars, each provided with a tubular hoe, in combination with the rock-bar, the spiral depressing-springs, and the loose lifting-rods connecting the rock-bar and hoes, said bars elongated, as described and shown, to permit the hoes to descend below their normal operative positions free from the influence of the springs.

7. In combination with the hoes, the depressing-springs, the lifting-rods for the hoes, and the operating devices for said rods, the rods being prolonged, as described and shown, to permit the independent vertical play of the hoes in an operative position free from the pressure of the springs.

In testimony whereof I hereunto set my hand, this 14th day of August, 1884, in the presence of two attesting witnesses.

WILLIAM C. DOWNEY.

Witnesses:
C. C. KIRKPATRICK,
J. W. SPAHR.